United States Patent
O'Neil et al.

(10) Patent No.: US 7,639,715 B1
(45) Date of Patent: Dec. 29, 2009

(54) DEDICATED APPLICATION INTERFACE FOR NETWORK SYSTEMS

(75) Inventors: Douglas E. O'Neil, Auburn, CA (US); Michael I. Thompson, Colfax, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 609 days.

(21) Appl. No.: 11/223,693

(22) Filed: Sep. 9, 2005

(51) Int. Cl.
*H04J 3/24* (2006.01)
(52) U.S. Cl. ............... 370/474; 370/389; 370/412; 709/250
(58) Field of Classification Search ........... 370/474, 370/351, 360, 392, 394, 369, 395.52, 395.71, 370/469, 471, 476, 413, 419; 709/202, 230, 709/233, 235, 236, 243, 245, 250
See application file for complete search history.

(56) References Cited

U.S. PATENT DOCUMENTS

| | | | |
|---|---|---|---|
| 5,390,299 A | 2/1995 | Rege et al. | |
| 5,937,169 A | 8/1999 | Connery et al. | |
| 6,246,683 B1 | 6/2001 | Connery et al. | |
| 6,247,060 B1 | 6/2001 | Boucher et al. | |
| 6,272,551 B1 * | 8/2001 | Martin et al. | 709/250 |
| 6,334,153 B2 | 12/2001 | Boucher et al. | |
| 6,373,841 B1 | 4/2002 | Goh et al. | |
| 6,393,487 B2 | 5/2002 | Boucher et al. | |
| 6,427,171 B1 | 7/2002 | Craft et al. | |
| 6,434,620 B1 | 8/2002 | Boucher et al. | |
| 6,457,066 B1 | 9/2002 | Mein et al. | |
| 6,470,173 B1 | 10/2002 | Okada et al. | |
| 6,470,415 B1 | 10/2002 | Starr et al. | |
| 6,526,446 B1 | 2/2003 | Yang et al. | |
| 6,535,518 B1 | 3/2003 | Hu et al. | |
| 6,591,302 B2 | 7/2003 | Boucher et al. | |
| 6,678,734 B1 * | 1/2004 | Haatainen et al. | 709/230 |
| 6,687,757 B1 | 2/2004 | Ben-Ze'ev et al. | |
| 6,697,868 B2 | 2/2004 | Craft et al. | |
| 6,791,947 B2 | 9/2004 | Oskouy et al. | |
| 6,859,867 B1 | 2/2005 | Berry | |
| 6,976,174 B2 | 12/2005 | Terrell et al. | |
| 7,076,568 B2 | 7/2006 | Philbrick et al. | |
| 7,103,317 B2 | 9/2006 | Chang et al. | |
| 7,149,226 B2 | 12/2006 | Wolrich et al. | |
| 7,167,927 B2 | 1/2007 | Philbrick et al. | |
| 2001/0053150 A1 | 12/2001 | Clear et al. | |

(Continued)

OTHER PUBLICATIONS

"Notice of Allowance from USPTO dated May 16, 2008 for US U.S. Appl. No. 10/620,040".

(Continued)

*Primary Examiner*—Ricky Ngo
*Assistant Examiner*—Gary Mui
(74) *Attorney, Agent, or Firm*—Klein, O'Neill & Singh, LLP

(57) ABSTRACT

Method and system for receiving and sending network packets from a network is provided. The system includes, a host processor that executes an operating system for a host system and at least one application that runs in a context that is different from a context of the operating system; and a network adapter with a hardware device that can run a network protocol stack, wherein the application can access the network adapter directly via an application specific interface layer without using the operating system.

8 Claims, 5 Drawing Sheets

U.S. PATENT DOCUMENTS

| | | |
|---|---|---|
| 2002/0062333 A1 | 5/2002 | Anand et al. |
| 2002/0095519 A1 | 7/2002 | Philbrick et al. |
| 2002/0156908 A1 | 10/2002 | Basso et al. |
| 2002/0174244 A1 | 11/2002 | Beckwith et al. |
| 2003/0046330 A1 | 3/2003 | Hayes |
| 2003/0046418 A1 | 3/2003 | Raval et al. |
| 2003/0058889 A1 | 3/2003 | Lansing et al. |
| 2003/0079033 A1 | 4/2003 | Craft et al. |
| 2003/0108066 A1 | 6/2003 | Trippe |
| 2003/0196081 A1 | 10/2003 | Savarda et al. |
| 2003/0204634 A1 | 10/2003 | Pinkerton et al. |
| 2003/0212735 A1* | 11/2003 | Hicok et al. ............... 709/201 |
| 2003/0214909 A1* | 11/2003 | Maciel ....................... 370/235 |
| 2003/0231625 A1 | 12/2003 | Calvignac et al. |
| 2004/0042483 A1 | 3/2004 | Elzur et al. |
| 2004/0044798 A1 | 3/2004 | Elzur et al. |
| 2004/0057380 A1* | 3/2004 | Biran et al. ................. 370/235 |
| 2004/0062267 A1 | 4/2004 | Minami et al. |
| 2004/0250059 A1 | 12/2004 | Ramelson et al. |
| 2005/0144402 A1 | 6/2005 | Beverly |
| 2005/0198410 A1 | 9/2005 | Kagan et al. |
| 2006/0031524 A1 | 2/2006 | Freimuth et al. |
| 2006/0209897 A1 | 9/2006 | Joung |

OTHER PUBLICATIONS

"Office Action from USPTO dated Jul. 22, 2008 for U.S. Appl. No. 11/340,023".

"Office Action from USPTO dated Oct. 10, 2008 for U.S. Appl. No. 11/222,594".

"Final Office action from USPTO dated Jan. 23, 2009 for U.S. Appl. No. 11/340,023".

"Final Office Action from USPTO dated Apr. 17, 2009 for U.S. Appl. No. 11/222,594".

"Office Action from USPTO dated Jul. 24, 2009 for U.S. Appl. No. 11/340,023".

"Office Action from USPTO dated Aug. 14, 2009 for U.S. Appl. No. 11/222,594".

* cited by examiner

DEDICATED APPLICATION INTERFACE FOR NETWORK SYSTEMS

CROSS REFERENCE TO RELATED APPLICATIONS

This patent application is related to the following U.S. patent applications, the disclosures of which are incorporated herein by reference in their entirety: Ser. No. 11/222,594, entitled "METHOD AND SYSTEM FOR MEMORY VALIDATION", filed on even date herewith; and Ser. No. 10/620,040, entitled "Method and System for Processing Network Data Packets", filed on Jul. 15, 2003.

BACKGROUND

1. Field of the Invention

The present invention relates to network systems, and more particularly, to offloading host system operating tasks for managing network related operations.

2. Background of the Invention

Computer networks are commonly used today in various applications. Computer networks typically use a layered protocol structure to manage network traffic. One common model that is typically used is the ISO model that includes a physical layer, a data link layer that includes a MAC layer, a network layer and others.

Various protocols/standards are currently used by computing systems and devices to communicate via networks. The following provides an introduction of some of the standards/protocols:

Transmission Control Procotol/Internet Protocol ("TPC/IP"): TCP is a standard network protocol (incorporated herein by reference in its entirety) that provides connection-oriented, reliable, byte stream service. This means that two nodes establish a logical connection before sending data and that TCP maintains state information regarding the data transfer. Reliable means that data is delivered in the same order that it was sent. A byte stream service means that TCP views data to be sent as a continuous data stream that is sent in any way it sees fit and delivers it to the remote node as a byte stream.

The IP standard protocol (incorporated herein by reference in its entirety) provides a datagram service whose function is to enable routing of data through various network subnets. Each of these subnets could be a different physical link such as Ethernet, ATM, etc. IP is also responsible for fragmentation of the transmit data to match a local link's MTU. IP can fragment data at the source node or at any intervening router between the source and destination node.

A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series that is incorporated herein by reference in its entirety.

iSCSI Protocol: Internet SCSI (iSCSI) as defined by the Internet Engineering Task Force (IETF) maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. The iSCSI and TCP/IP protocol suite consist of 4 protocol layers; the application layer (of which iSCSI is one application), the transport layer (TCP), the network layer (IP) and the link layer (i.e. Ethernet).

A traditional SCSI connection between a host system and peripheral device is through parallel cabling and is limited by distance and device support constraints. For storage applications, iSCSI was developed to take advantage of network architectures based on Ethernet standards. iSCSI leverages the SCSI protocol over established networked infrastructures and defines the means for enabling block storage applications over TCP.

The iSCSI architecture is based on a client/server model. Typically, the client is a host system such as a file server that issues a read or write command. The server may be a disk array that responds to the client request. Typically the client is an initiator that initiates a read or write command and a disk array is a target that accepts a read or write command and performs the requested operation.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

There has been a need to offload TCP/IP protocol stack processing from a host computer system to a network adapter. A network adapter that executes the TCP/IP protocol stack is called a TOE (TCP Offload Engine).

Most TOE devices provide a single physical interface to a host processor ("CPU"). Applications that run on the host side are allocated memory locations. In most environments (for example, Windows®, Linux and others) the memory locations on the host side used to access the TOE interface is controlled by the operating system. This is inefficient because the operating system context to receive and send data on behalf of the application is different from the context of the application. Hence, context switching between the application and the operating system is used by conventional systems to process network traffic. This can result in latencies and network bandwidth degradation and hence is undesirable.

Therefore there is a need for a system and method that will allow plural applications running on a host system to efficiently access an adapter to communicate with a network.

SUMMARY OF THE INVENTION

In one aspect of the present invention, a system coupled to a network is provided. The system includes, a host processor that executes an operating system for a host system and at least one application that runs in a context that is different from a context of the operating system; and a network adapter with a hardware device that can run a network protocol stack, wherein the application can access the network adapter directly via an application specific interface layer without using the operating system.

In another aspect of the present invention, a method for network communications is provided. The method includes, initializing a socket call, wherein an application having it's own context in a host computing system sends the socket call; and accessing a network adapter coupled to the host system, wherein the network adapter processes network traffic by executing a network protocol, and the application running on the host system accesses the network adapter using an application specific interface layer without using an operating system that runs on the host system.

In another aspect of the present invention, a host computing system coupled to a network for receiving and transferring network packets is provided. The host computing system includes, a host processor that executes an operating system and at least one application that runs in a context that is different from a context of the operating system; and a network adapter with a hardware device for executing a network protocol stack for processing network traffic, wherein the application can access the network adapter directly via an application specific interface layer without using the operating system.

In yet another aspect of the present invention, a network adapter for offloading network protocol processing from a host system is provided. The network adapter includes, an offload engine that offloads network protocol processing from a host processor of the host system having an operating system and at least one application that runs in a context that is different from a context of the operating system; wherein the application can access the network adapter directly via an application specific interface layer without using the operating system.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a host system will be described. The specific architecture and operation of the preferred embodiment will then be described with reference to the general architecture.

Figure 1:
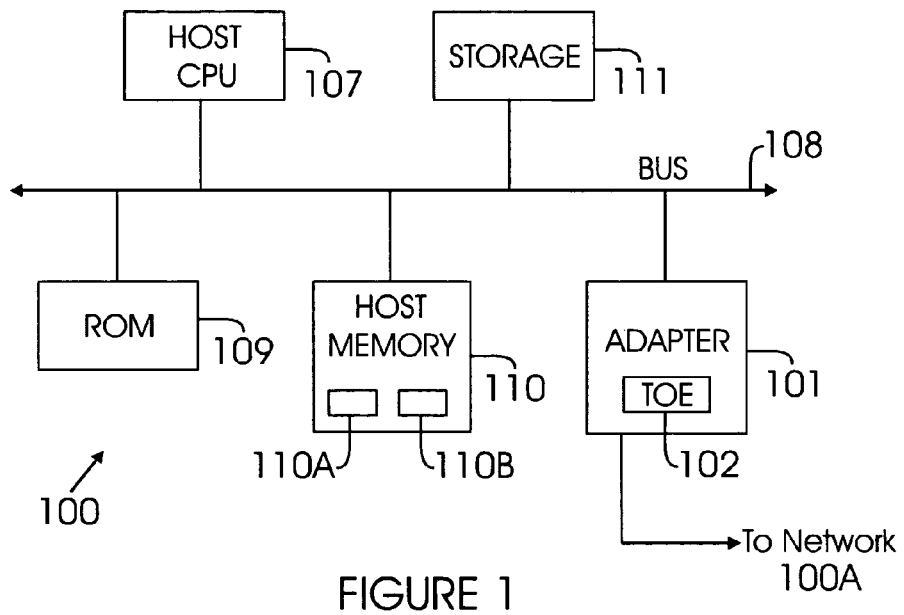
FIG. 1 is a block diagram of a host system.

FIG. 1 shows a block diagram of a computing system 100. Computing system 100 typically includes several functional components. These components may include a central processing unit (CPU) 107, host memory (or main/system memory) 110, input/output ("I/O") devices (not shown), read only memory 109, a network adapter 101 with TOE 102, and streaming storage devices (for example, tape drives) 111.

Host memory 110 is coupled to the CPU 107 via a system bus 108 or a local memory bus (not shown). The host memory 110 is used to provide CPU 107 access to data and/or program information that is stored in host memory 110 at execution time. Typically, the host memory is composed of random access memory (RAM) circuits. A computing system with the CPU and main memory is often referred to as a host system.

Figure 4:
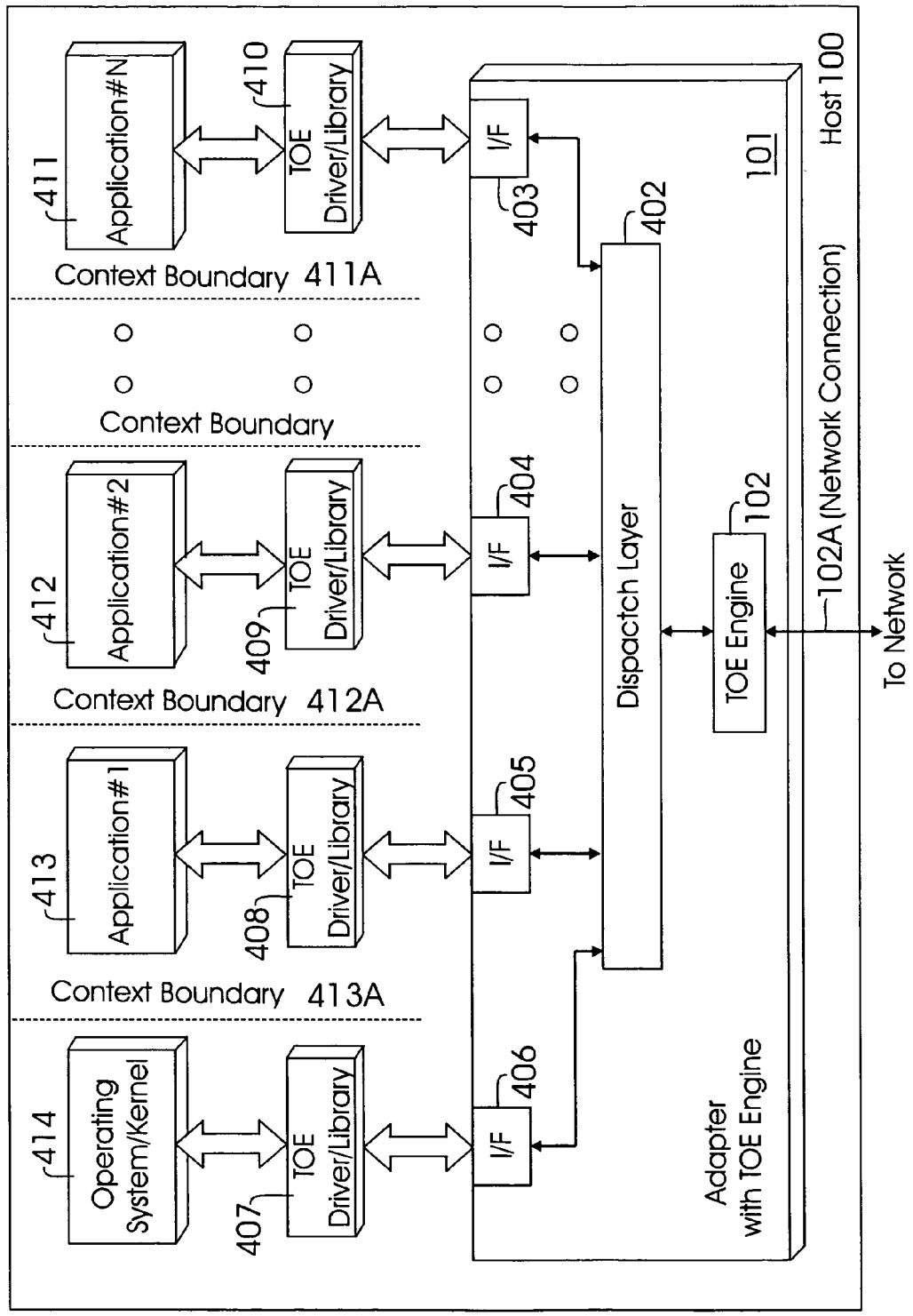
FIG. 4 is a block diagram showing a dedicated application interface for an application running on a host system to interface with a network adapter having a TOE, according to one aspect of the present invention.

In host memory 110, specific locations (for example, 110A and 110B) may be allocated to specific applications (for example, 412 and 413 in FIG. 4).

System 100 includes a network adapter 101 having a TCP/IP accelerator module (or "chip" or "system" or "engine") "TOE" 102 that is used to connect host system 100 to another host system or peripheral device (not shown) via a network connection 100A.

TOE 102 provides assistance to improve the speed of iSCSI read and write transactions as well as a full implementation of a TCP/IP protocol. TOE 102 also includes an embedded Ethernet MAC, to connect a PCI based host to a LAN (not shown).

In conventional systems, a host CPU (for example, 107) executes the network protocol stack in software to process network packets. Conventional TOE engines also provide only a partial solution, because they cannot handle exceptions (for example, TCP/IP exceptions).

In the configuration shown in FIG. 1, CPU 107 does not have to execute a network protocol stack in software because TOE 102 can perform that entire function. TOE 102 can establish and maintain a network connection to process network traffic. Details of a TOE 102 are provided in co-pending patent application, Ser. No. 10/620,040, filed on Jul. 15, 2003, incorporated herein by reference in its entirety.

The present invention provides an offloaded implementation of a full network protocol stack (for example, a TCP/IP stack). Application Programming Interfaces (APIs) to this protocol stack are made available to allow host software to take advantage of the offloaded protocol stack for network applications.

The present invention may be used on a PCI development board with a Field Programmable gate Array ("FPGA"). The chip may also be integrated into an Application Specific Integrated Circuit ("ASIC") with an embedded serialize/de-serializer ("SERDES") (not shown) and internal programmable random access memory ("RAM").

It is noteworthy that the present invention is not limited to any particular protocol or standard. Although the figures and the foregoing examples are based on offloading TCP/IP protocol and illustrate iSCSI transactions, in one aspect of the present invention, adapter 101 may include an offload engine that can process any network protocol stack (for example, the SPX/IPX protocol) for any transaction.

Figure 2:
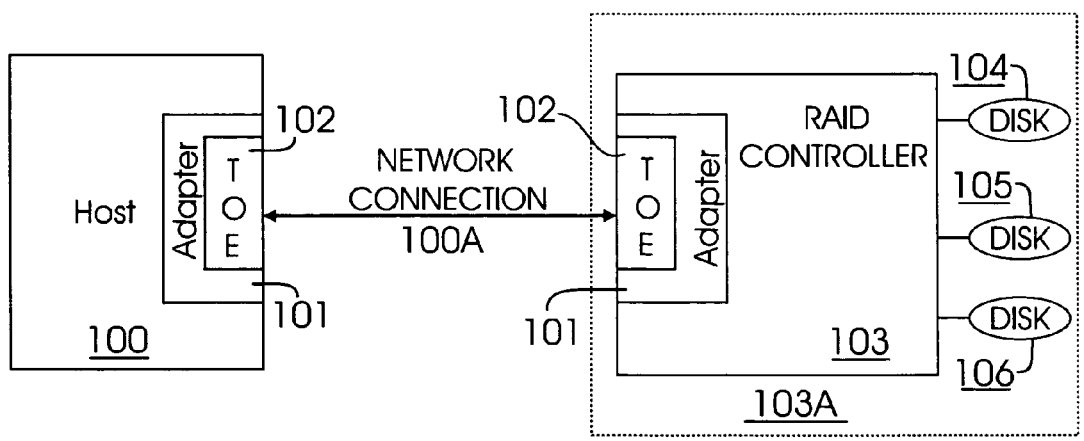
FIG. 2 shows a block diagram of a host system coupled to a storage system using a TOE, according to one aspect of the present invention.

FIG. 2 shows a block diagram of host system 100 coupled to a storage system 103A via a network connection 100A. In one aspect, TOE 102 allows connection of SCSI based mass storage devices to an Ethernet LAN. Adapter 101 may be a host bus adapter that is used by host system 100 in a storage area network to move data to and from storage systems that are a part of the storage area network.

Adapter 101 according to the present invention can be used for both initiator and target applications (i.e. can be used on a host bus adapter 101 or with a redundant array of inexpensive disks ("RAID") controller 103). As shown in FIG. 2, RAID controller 103 is coupled to plural storage devices, for example, 104, 105 and 106.

Figure 3I:
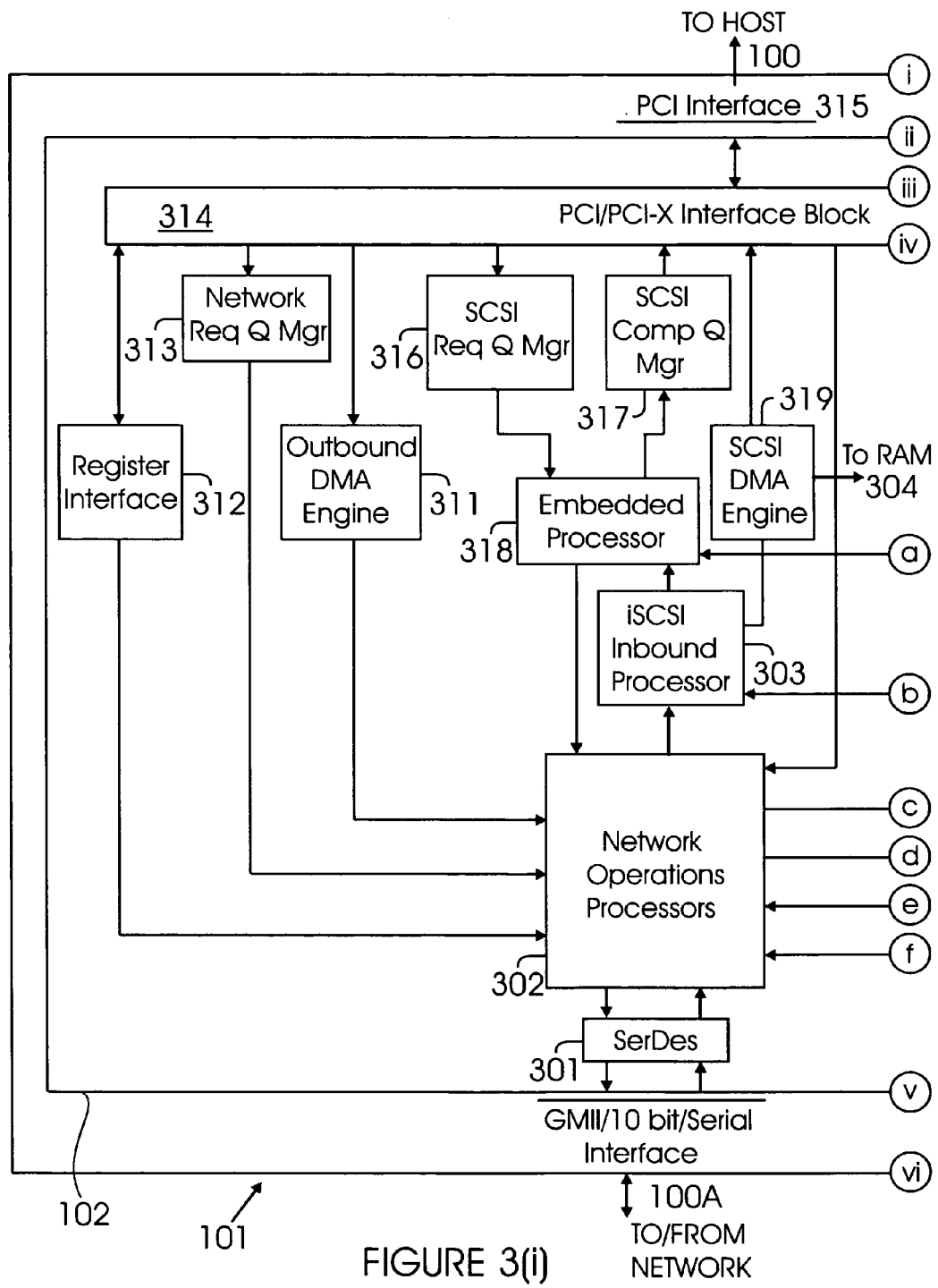
FIG. 3 is a block diagram of a network adapter, according to one aspect of the present invention.
Figure 3:
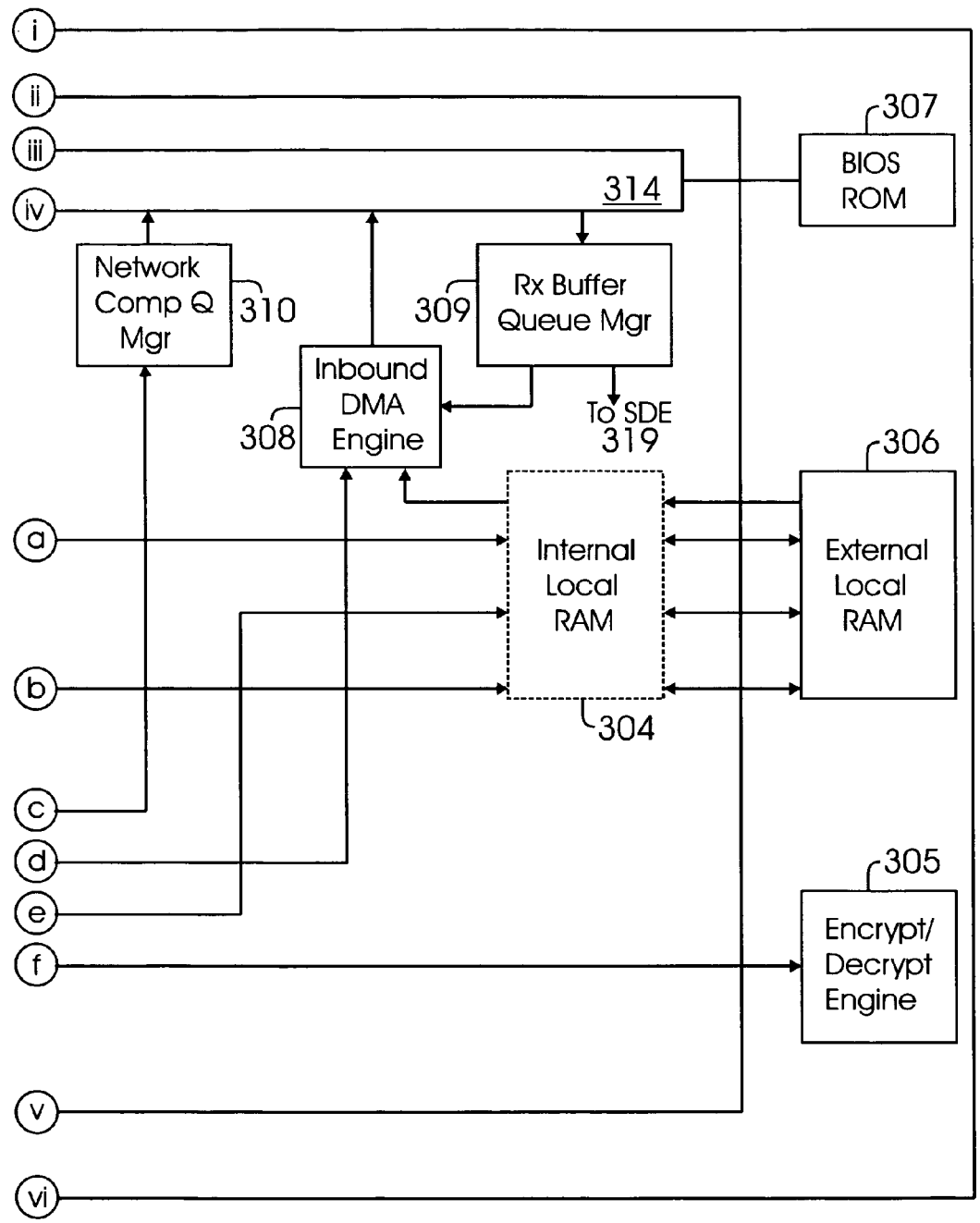

FIG. 3 shows a block diagram of network adapter 101 (may also be referred to as "system 101") according to one aspect of the present invention, with various components described below. Data enters/leaves system 101 through a serial/deserializer ("SERDES") 301 that converts incoming and outgoing data into a serial and non-serial format.

System 101 includes an embedded processor 318 that is used to process SCSI requests into iSCSI exchanges to transfer SCSI based data. Processor 318 also generates completion messages for host 100.

iSCSI processor 303 includes hardware state machines/firmware which synchronizes incoming byte streams from TCP, finds iSCSI PDU boundaries, sends data to host 100 via SCSI direct memory access engine/module ("SDE") 319.

System 101 also includes network operation processors "NOPs" 302 that include plural state machines for different network protocols, for example, TCP, IP, and Ethernet for both traffic entering and leaving system 101. The state machines handle most of the data transfer without host CPU 107 involvement. Local memory interface 304 is used by various system 101 components to access external memory 306 (in this illustration, RAM 306).

Encryption/de-cryption engine 305 is used to encrypt/decrypt data while data is moved in and out of host 100, using system 101. Standard encryption/de-cryption techniques may be used.

Two DMA engines (or modules) are used by NOPs 302 to move data to and from host 100. Inbound DMA module 308 is used to move data from system 101 (i.e. from local memory 306) to host 100 memory. Buffer queue manager 309 maintains small and large buffers that are used by Inbound DMA engine 308. Outbound DMA engine 311 is used to move data from host 100 memory to system 101 for transmission to the network.

SCSI DMA Engine (SDE 319) provides iSCSI processor 303 with a DMA channel from Local RAM 306 to Host 100 memory. SDE 319 includes a byte packer function that takes unaligned or less than 8 byte buffers and packs them into 8 byte words before sending them to Host 104.

System 101 also includes request queue managers (the term manager and module are used interchangeably throughout this specification) (313 and 316) that are used to pass commands to chip 102 to perform a specific operation. SCSI request queue manager 316 is used for initiating SCSI based transfers, while module 313 is used for TCP, IP, Ethernet or any other protocol/standard.

Completion queue managers (310 and 317) are used to send completion messages to host 100. These messages are generated to report status of inbound (i.e. from the network to system 101 and then to host 100) to outbound (i.e. from host 100 to the network via system 101) transfers. SCSI completion manager 317 handles SCSI completion messages, while non-SCSI messages are handled by module 310.

Register interface 312 provides host 100 access to plural system 101 status and control registers, as well as a channel to access local memory 306.

PCI/PCI-X interface block 314 and PCI interface 315 provide a PCI/PCI-X interface between host 100 and system 101. BIOS Read only memory 307 is also provided to store invariant instruction sequences such as start-up instruction sequences or basic input/output operating system (BIOS) sequences instructions.

FIG. 4 shows a top-level block diagram of a host system coupled to adapter 101, according to one aspect of the present invention. Adapter 101 with TOE 102 is described above with respect to FIG. 3. TOE 102 interfaces with a dispatch layer 402 that interfaces with plural interfaces 403, 404, 405 and 406. Interface 403-406 allow host operating system/application(s) access to TOE 102.

Interface 406 receives data/commands from the host operating system 414 via a TOE driver/library 407 (may be referred to as library 407). Library 407 allows the operating system to interface with TOE engine 102 via interface 406.

Plural applications shown as 413, 412 and 414 run on host system 100 in their individual contexts (shown as 411A, 412A and 413A). Each application is assigned space in system memory (shown as 110A and 110B, FIG. 1). Each application (for example, 413) has a special TOE driver/library (may also be referred to as a "module") (for example, 408, 409 and 410) that allows an application to interface directly with the TOE engine 102. Adapter 101 is made available to each application based on program code that runs within an application's context.

When an application (for example, 413) wants to establish a network connection, the application directly places a call via its own specific interface module (for example, 408 for application 413) without using the operating system 414. Adapter 101 establishes the connection and interfaces with the application directly through the application specific TOE driver (for example 408). In one aspect of the present invention, the operating system 414 is not involved with an application establishing a network connection.

Figure 5:
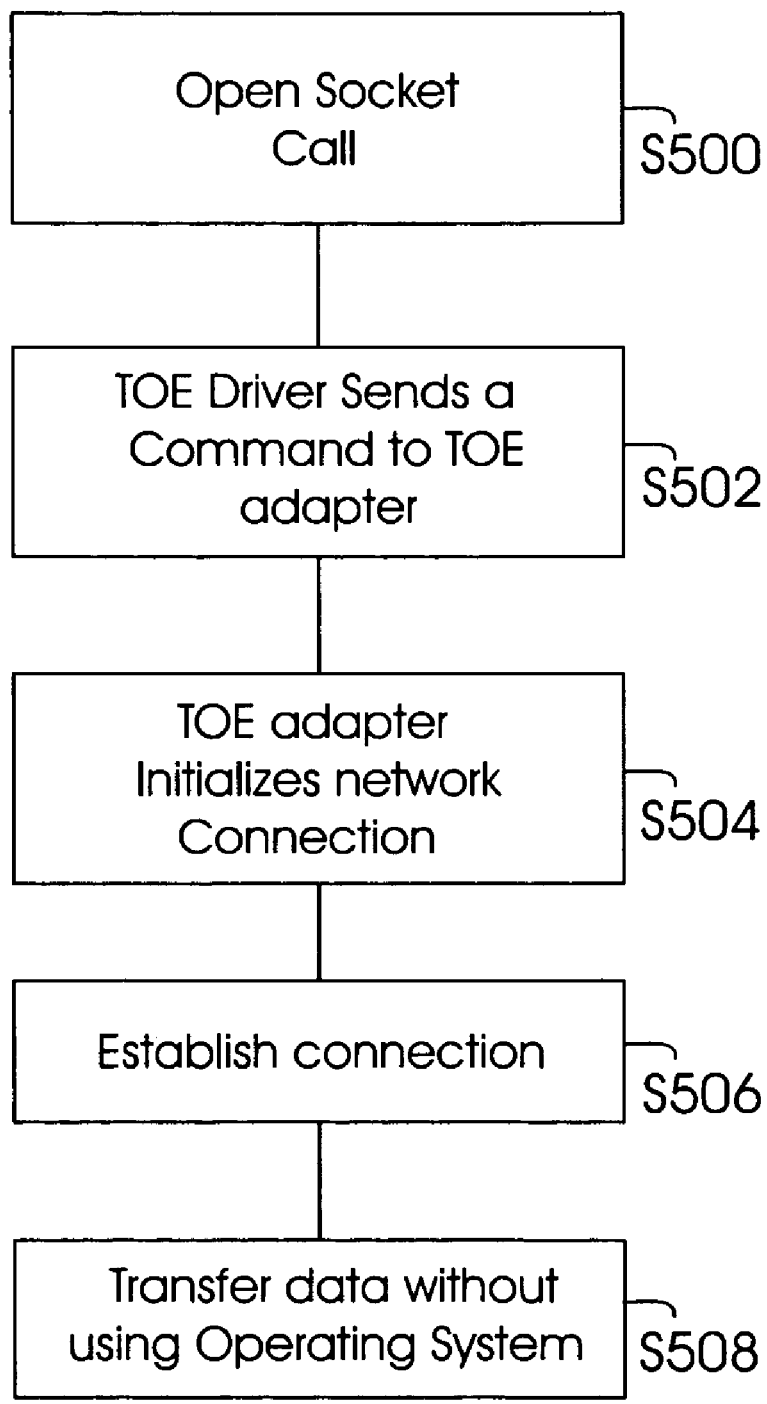
FIG. 5 shows a flow diagram for using the system in FIG. 4, according to one aspect of the present invention.

FIG. 5 shows a process flow diagram for using the system of FIG. 4. Turning in detail to FIG. 5, in step S500, an application (for example, 413) opens a socket call in a TOE driver (for example, 408 for application 413).

In step S502, the TOE driver (for example, 408) associated with the application sends a command to the TOE engine 102. Typically, this command is sent by the operating system 414, but because of the distributed architecture of FIG. 4, an application 413 can directly send the command.

In step S504, adapter 101 initializes the network connection. In one aspect, the network connection is a TCP/IP connection.

In step S506, the connection is established and in step S508, data is transferred by adapter 101 to the appropriate memory allocated for a particular application. This data transfer occurs without using operating system 414.

It is noteworthy that the adaptive aspects of the present invention are not limited to any particular operating system (for example Windows® or Linux) or to any particular network protocol (for example, TCP/IP).

Although the present invention has been described with reference to specific embodiments, these embodiments are illustrative only and not limiting. Many other applications and embodiments of the present invention will be apparent in light of this disclosure and the following claims.

What is claimed is:

1. A system coupled to a network for receiving and sending network packets, comprising:

a host processor that executes an operating system within an operating system context, and a plurality of applications, each application being executed within an application context that is different from the operating system context; and a network adapter having a TCP/IP offload engine (TOE) that executes a TCP/IP network protocol stack to process TCP/IP packets instead of the operating system, wherein each of the plurality of applications communicate with the network adapter via its own dedicated application specific TOE driver and the operating system interfaces with the network adapter via a separate operating system interface;

wherein the network adapter includes a plurality of dedicated interface modules, each dedicated interface module communicates with the corresponding dedicated application specific TOE driver for each of the plurality of applications; and wherein each of the plurality of applications establishes a connection directly with the network adapter via the dedicated application specific TOE drivers and the corresponding dedicated interface modules, without using the operating system.

2. The system of claim 1, wherein plural applications running on the host computing system can access the network adapter via application specific interface layers.

3. A method for network communication, comprising:

initializing a socket call from at least one of a plurality of applications, each application executed in an application context that is different from an operating system context in a host computing system;

interfacing an operating system of the host computing system with a network adapter via an operating system interface; and establishing a direct communication connection between the at least one of the plurality of applications and a TCP/IP offload engine on the network adapter via an application specific TOE driver on the host computing system dedicated to the at least one of the plurality of applications and a corresponding interface module on the network adapter, without using the operating system running on the host computing system.

4. The method of claim 3, wherein context switching between the application and the operating system is not needed to transfer packets using the network adapter.

5. A host computing system coupled to a network for receiving and transferring network packets, comprising:

a host processor that executes an operating system within an operating system context, and a plurality of applications, each application being executed within an application context that is different from the operating system context; and a network adapter having a TCP/IP offload engine (TOE) for executing a network protocol stack to process TCP/IP packets instead of the operating system, wherein the network protocol stack is a TCP/IP stack and wherein each of the plurality of applications communicate with the network adapter via its own dedicated application specific TOE driver and the operating system interfaces with the network adapter via a separate operating system interface, wherein the network adapter includes a plurality of dedicated interface modules, each dedicated interface module communicates with the corresponding dedicated application specific TOE driver for each of the plurality of applications, and wherein each of the plurality of applications establishes a connection directly with the network adapter using the dedicated application specific TOE drivers and the corresponding dedicated interface modules via an application specific interface layer running a program code within the appropriate application contexts without using the operating system.

6. A network adapter for offloading network protocol processing from a host system, comprising:

a TCP/IP offload engine that offloads network protocol processing from a host processor of the host system having an operating system executing within an operating system context, and a plurality of applications that execute within application contexts that are different from the operating system context, wherein the network protocol is a TCP/IP stack, and wherein the TCP/IP offload engine processes TCP/IP packets instead of the host system;

wherein the plurality of applications communicate directly with the network adapter via a plurality of corresponding dedicated application drivers, and the operating system interfaces with the network adapter via a separate operating system interface;

wherein the network adapter includes a plurality of interface modules, each interface module communicates with a corresponding one of the dedicated application drivers for each of the plurality of applications; and wherein each of the plurality of applications establishes a connection directly with the network adapter via the dedicated application drivers and the corresponding interface modules, without using the operating system.

7. A system coupled to a network for receiving and sending network packets, comprising:

a host processor that executes an operating system within an operating system context, and a plurality of applications, each application being executed within an application context that is different from the operating system context; and a network adapter including a TCP/IP offload engine interfacing with a network to process TCP/IP packets instead of the operating system, wherein each of the plurality of applications communicate with the network adapter via a dedicated application specific TOE driver and the operating system interfaces with the network adapter via a separate operating system interface;

wherein the network adapter includes a plurality of application specific interface modules, each application specific interface module communications with the corresponding dedicated application specific TOE driver for each of the plurality of applications; and wherein each of the plurality of applications establishes a connection directly with the network adapter via the dedicated application specific TOE drivers and the corresponding application specific interface modules, without using the operating system.

8. The system of claim 7, wherein plural applications running on the host computing system can access the network adapter via application specific interface layers.

* * * * *

UNITED STATES PATENT AND TRADEMARK OFFICE
CERTIFICATE OF CORRECTION

| | | |
|---|---|---|
| PATENT NO. | : 7,639,715 B1 | Page 1 of 1 |
| APPLICATION NO. | : 11/223693 | |
| DATED | : December 29, 2009 | |
| INVENTOR(S) | : Douglas E. O'Neil et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

On the Title page, in Item (56), in column 2, under "Other Publications", line 1, after "for" delete "US".

In column 1, line 10, delete "entitled" and insert -- entitled, --, therefor.

In column 1, line 33, delete "Procotol/Internet" and insert -- Protocol/Internet --, therefor.

In column 1, line 33, delete "("TPC/" and insert -- ("TCP/ --, therefor.

In column 8, line 49, in claim 7, delete "communications" and insert -- communicates --, therefor.

Signed and Sealed this

Fifth Day of October, 2010

David J. Kappos
*Director of the United States Patent and Trademark Office*